US011789592B1

(12) United States Patent
Fehlman, II

(10) Patent No.: US 11,789,592 B1
(45) Date of Patent: *Oct. 17, 2023

(54) SYSTEMS AND METHODS FOR INGESTING AND PARSING DATASETS GENERATED FROM DISPARATE DATA SOURCES

(71) Applicant: United Services Automobile Association (USAA), San Antonio, TX (US)

(72) Inventor: William Leland Fehlman, II, Williamsburg, VA (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/823,878

(22) Filed: Aug. 31, 2022

Related U.S. Application Data

(63) Continuation of application No. 17/108,855, filed on Dec. 1, 2020, now Pat. No. 11,455,077, which is a
(Continued)

(51) Int. Cl.
G06F 16/34 (2019.01)
G06F 3/0482 (2013.01)
G06F 17/16 (2006.01)
G06F 16/35 (2019.01)
G06N 20/00 (2019.01)
(Continued)

(52) U.S. Cl.
CPC ............ *G06F 3/0482* (2013.01); *G06F 16/34* (2019.01); *G06F 16/353* (2019.01); *G06F 17/16* (2013.01); *G06F 40/123* (2020.01); *G06F 40/279* (2020.01); *G06N 20/00* (2019.01)

(58) Field of Classification Search
CPC ....................................................... G06F 40/30
See application file for complete search history.

(56) References Cited

U.S. PATENT DOCUMENTS 7,130,848 B2 10/2006 Oosta
7,483,892 B1 1/2009 Sommer et al.
(Continued)

*Primary Examiner* — Di Xiao
(74) *Attorney, Agent, or Firm* — Fletcher Yoder P.C.

(57) ABSTRACT

Disclosed herein are systems and methods capable of performing text exploration on large volume of corpus without prior knowledge in an accurate and efficient manner and may also provide any number of additional or alternative benefits and advantages. In particular, embodiments described herein provide a text exploration executable environment that uses unsupervised machine-learning to assist a human analyst with distilling key emerging themes from a corpus of hundreds or thousands of text files presented in a time series graphical user interface (GUI). A document may be a unit of text under analysis received from a particular data source, such as word-processing documents, paragraphs, sentences, chat sessions, speech-to-text call segments, online texts, social media postings (e.g., Tweets®), and other machine-readable text. In operation, a human analyst may use a text exploration software tool to identify the themes and stories within the corpus, by using integrated, synchronized GUIs that are dynamically generated by the software exploration tool.

20 Claims, 7 Drawing Sheets

Related U.S. Application Data continuation of application No. 16/584,531, filed on Sep. 26, 2019, now Pat. No. 10,866,700, which is a continuation of application No. 15/725,094, filed on Oct. 4, 2017, now Pat. No. 10,444,945.

(60) Provisional application No. 62/406,273, filed on Oct. 10, 2016.

(51) Int. Cl.
*G06F 40/123* (2020.01)
*G06F 40/279* (2020.01)

(56) References Cited

U.S. PATENT DOCUMENTS

| | | | |
|---|---|---|---|
| 8,245,135 B2 | 8/2012 | Cai et al. | |
| 8,458,193 B1 | 6/2013 | Procopio | |
| 2003/0145014 A1 | 7/2003 | Minch | |
| 2006/0089947 A1* | 4/2006 | Gallivan | G06F 16/24575 |
| | | | 707/E17.084 |
| 2006/0259481 A1 | 11/2006 | Handley | |
| 2009/0177463 A1 | 7/2009 | Gallagher et al. | |
| 2011/0196872 A1 | 8/2011 | Sims et al. | |
| 2015/0026606 A1 | 1/2015 | Hill et al. | |
| 2015/0106081 A1* | 4/2015 | Chee | G06F 40/40 |
| | | | 704/9 |
| 2015/0379010 A1* | 12/2015 | Allen | G06F 16/3338 |
| | | | 707/731 |
| 2016/0110238 A1 | 4/2016 | Burugula et al. | |
| 2016/0364693 A1* | 12/2016 | Bigini | G06Q 10/1053 |
| 2019/0026372 A1 | 1/2019 | Lu et al. | |

* cited by examiner

| | Chat_Date | Memb. | Quote | Topic_Number | Topic_Term |
|---|---|---|---|---|---|
| 50 | 1/20/2016 | 5.1E+07 | If you are unable to type anything in the text field, your browser may no | 1 | browser |
| 54 | 1/20/2016 | 5.1E+07 | Please try a different browser or call us at 1-210-531-8722 or 1-800-531 | 1 | browser |
| 72 | 1/22/2016 | 5.1E+07 | If you cannot type anything on the text field, your browser may not be s | 1 | browser |
| 73 | 1/22/2016 | 5.1E+07 | If you are using the newest Internet Explorer you may want to change y | 1 | browser |
| 74 | 1/22/2016 | 5.1E+07 | If you cannot type anything on the text field, your browser may not be s | 1 | browser |
| 75 | 1/22/2016 | 5.1E+07 | If you are using the newest Internet Explorer you may want to change y | 1 | browser |
| 238 | 1/21/2016 | 5.3E+07 | If you are unable to type anything in the text field, your browser may no | 1 | browser |
| 239 | 1/21/2016 | 5.3E+07 | Please try a different browser or call us at 1-800-531-8722 for assistanc | 1 | browser |
| 346 | 1/20/2016 | 5.5E+07 | If you are unable to type anything in the text field, your browser may no | 1 | browser |
| 347 | 1/20/2016 | 5.5E+07 | Please try a different browser or call us at 1-800-531-8722 for assistanc | 1 | browser |
| 349 | 1/20/2016 | 5.5E+07 | If you are unable to type anything in the text field, your browser may no | 1 | browser |
| 350 | 1/20/2016 | 5.5E+07 | Please try a different browser or call us at 1-800-531-8722 for assistanc | 1 | browser |

SYSTEMS AND METHODS FOR INGESTING AND PARSING DATASETS GENERATED FROM DISPARATE DATA SOURCES

CROSS-REFERENCE TO RELATED APPLICATIONS

This application is a continuation of U.S. patent application Ser. No. 17/108,855, filed on Dec. 1, 2020, which is a continuation of U.S. patent application Ser. No. 16/584,531, filed on Sep. 26, 2019, which is a continuation of U.S. patent application Ser. No. 15/725,094, filed on Oct. 4, 2017, which claims priority to and benefit of U.S. Provisional Patent Application No. 62/406,273, filed on Oct. 10, 2016, each of which is incorporated herein by reference in its entirety for all purposes.

TECHNICAL FIELD

This application generally relates to computer networking, data management, and machine-learning.

BACKGROUND

Conventional enterprise network systems may currently employ multiple solutions for understanding customer interactions by pulling data from a plurality of data sources. Traditionally, structured data stored in relational databases has been the source for conducting analytics to understand such customer interactions, however unstructured data (e.g., plain text) is taking on a greater role to complement analytics and generate actionable insights.

Correspondingly, there is a need to generate data that helps better understand why customers contact enterprise service centers, and generate data indicating what actions or resolutions are occurring during each interaction. The data providing such insights may be generated by analyzing the semantics and latent themes found within the unstructured text in transcription files of inbound calls and/or online-chat sessions, between customers and member service representatives (MSRs), and other contact vectors (e.g., survey file submissions). Each day, a system may interact with customers through any number of channels, yielding unstructured text from the transcriptions of hundreds of thousands of telephone calls and thousands of online chat sessions, as well as text from thousands of emails, and the text from any number of other contact files, such as surveys and Twitter®.

Previously, teams of human analysts read thousands of call transcripts, online chat transcripts, and other files, to distill key emerging themes. Yet the amount of data that must be ingested by humans is not only a costly activity, but it is also an impossible task for humans to identify all of the hidden themes that could provide actionable insights. Speech and text (e.g., chat, emails, surveys) are often the primary forms of communication with customers, and provide the means for an enterprise to enhance experiences and relationships with customers. However, traditional approaches to analyzing speech and text typically require a human analyst to either listen to calls or read transcripts of calls or online chat session. Additionally, some current proprietary text analytics technologies may require a user to have some prior knowledge of the contents of a corpus, and have limited interactive features, both of which limit the amount of insights that a human analyst can glean from the corpus of customer interactions. What is needed is an intuitive framework for all levels of users to quickly gain actionable insights that is not dependent upon or subject to human deficiencies and inefficiencies. Moreover, what is also needed is a means for a machine to ingest data from any number of disparate data sources, having any number of formats or no formatting, and identify the context for each contact to determine the themes, reasons, and solutions associated with each customer contact event.

SUMMARY

Disclosed herein are systems and methods capable of addressing the above-described shortcomings and may also provide any number of additional or alternative benefits and advantages. In particular, embodiments described herein provide a text exploration executable environment that uses unsupervised machine-learning to assist a human analyst with distilling key emerging themes from a corpus of hundreds or thousands of text files presented in a time series graphical user interface (GUI). A document may be a unit of text under analysis received from a particular data source, such as word-processing documents, paragraphs, sentences, chat sessions, speech-to-text call segments, online texts, social media postings (e.g., Tweets®), and other machine-readable text. In operation a human analyst may use a text exploration software tool to identify the themes and stories within the corpus, by using integrated, synchronized GUIs that are dynamically generated by the software exploration tool.

In an embodiment, a computer-implemented method comprises receiving, by a computer, a plurality of text files from a plurality of data sources, each text file associated with a respective contact event via a respective data source; for each text file in the plurality of text files, removing, by the computer, a set of words satisfying a stop word list; generating, by the computer, one or more topic models based upon a set of one or more vocabulary words occurring in each text file exceeding a first threshold value; generating, by the computer, a vocabulary file for each text file from the plurality of text files containing a set of words extracted from the plurality of text files, wherein the set of words extracted from the plurality of text files are extracted, by the computer, based on a frequency of occurrence associated with each word satisfying a second threshold value; generating, by the computer, a vector for each text file in the plurality of text files based upon the set of words extracted from each respective text file, wherein a value corresponding to each dimension of the vector is determined by a frequency of occurrence associated with each word in the set of words; determining, by the computer, a distance value for each text file in the plurality of text files relative to other text files in the plurality of text files, wherein the distance value between two text files is determined based upon a similarity between two vectors corresponding to the two text files; generating, by the computer, a graphical user interface displaying a plurality of images representing each respective contact event based upon the distance value determined for each respective text file of each respective contact event; displaying, by the computer, the graphical user interface on a user device operated by a user; and in response to receiving from the user device a selection of a subset of the images representing contact events, generating, by the computer, a second graphical user interface containing a plurality of data fields associated with each of text file associated with the contact events of the selection, wherein at least one data field contains one or more extracts of a portion of each text file and the topic model corresponding to each text file, and wherein the user selects the subset of the images by interacting with the graphical user interface displayed on the user device.

In another embodiment, a computer system comprises a user device; and a computer in communication with the user device, wherein the computer is configured to: receive a plurality of text files from a plurality of data sources, each text file associated with a respective contact event via a respective data source; for each text file in the plurality of text files, remove a set of words satisfying a stop word list; generate one or more topic models based upon a set of one or more vocabulary words occurring in each text file exceeding a first threshold value; generate a vocabulary file for each text file from the plurality of text files containing a set of words extracted from the plurality of text files, wherein the set of words extracted from the plurality of text files are extracted, by the computer, based on a frequency of occurrence associated with each word satisfying a second threshold value; generate a vector for each text file in the plurality of text files based upon the set of words extracted from each respective text file, wherein a value corresponding to each dimension of the vector is determined by a frequency of occurrence associated with each word in the set of words; determine a distance value for each text file in the plurality of text files relative to other text files in the plurality of text files, wherein the distance value between two text files is determined based upon a similarity between two vectors corresponding to the two text files; generate a graphical user interface displaying a plurality of images representing each respective contact event based upon the distance value determined for each respective text file of each respective contact event; display the graphical user interface on the user device operated by a user; and in response to receiving from the user device a selection of a subset of the images representing contact events, generate a second graphical user interface containing a plurality of data fields associated with each of text file associated with the contact events of the selection, wherein at least one data field contains one or more extracts of a portion of each text file and the topic model corresponding to each text file, and wherein the user selects the subset of the images by interacting with the graphical user interface displayed on the user device.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

FIG. 6 shows a graphical user interface, according to an exemplary embodiment of FIG. 3, FIG. 4, and FIG. 5.

DETAILED DESCRIPTION

Figure 1:
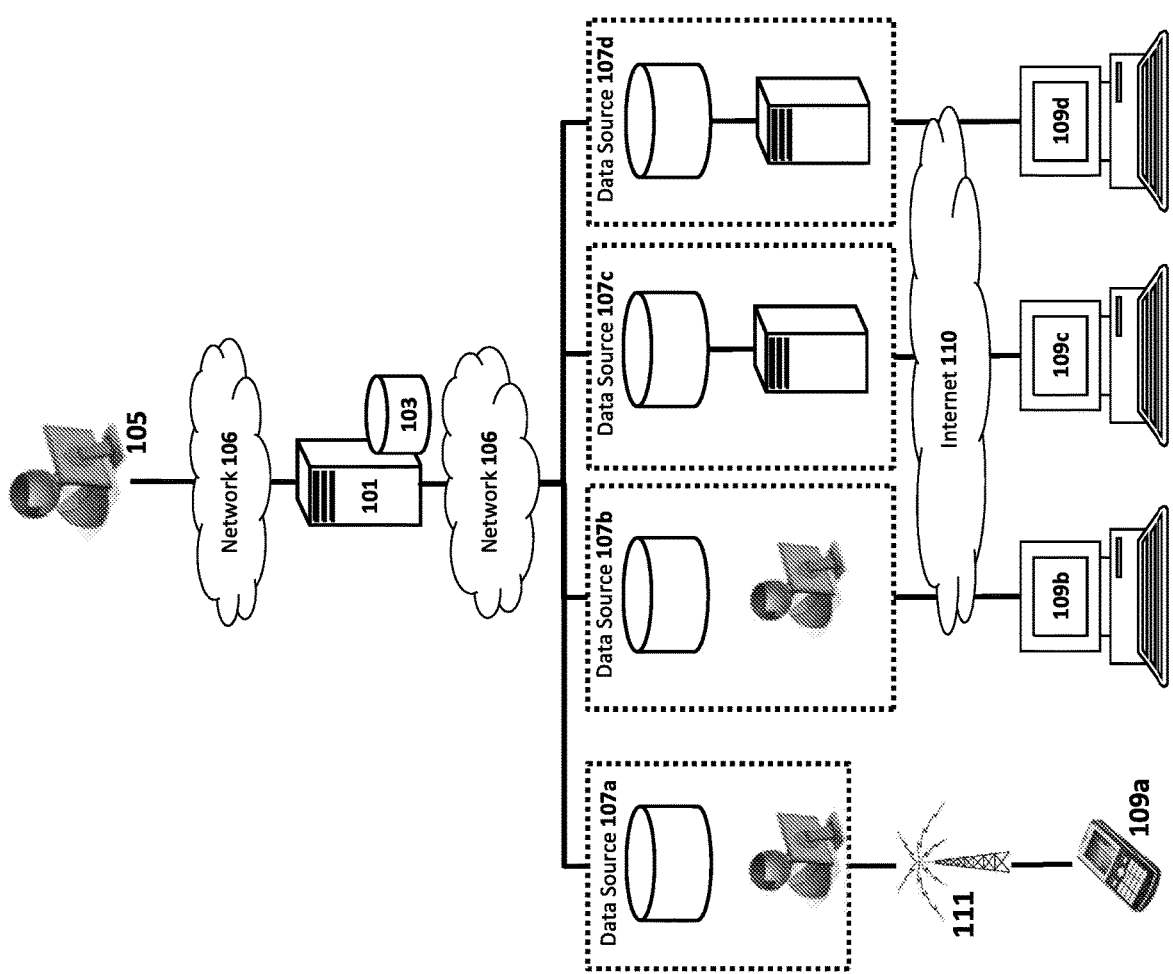
FIG. 1 shows components of a system, according to an exemplary embodiment.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

The embodiments described herein provide systems and methods for ingesting data files in any number of formats, from any number of data sources to generate a corpus of hundreds or thousands of text-based files. The system may provide a text exploration executable environment in which an enterprise system may receive data feeds from any number of data sources and store the text into a corpus database. A client device executing a text exploration software program may query the corpus database and generate a set of GUIs that provide a user analyst context derived from the corpus. The server may employ unsupervised machine-learning to assist a human analyst with distilling key emerging themes from a corpus of hundreds or thousands of text files. The results of the machine-learning may be presented in one or more interactive time-series graphical user interfaces (GUIs).

A document may be a unit of text under analysis received from a particular data source, such as word-processing documents, paragraphs, sentences, chat sessions, speech-to-text call segments, online texts, social media postings (e.g., Tweets®), and other machine-readable text. In operation a human analyst may use a text exploration software tool to identify the themes and stories within the corpus, by using integrated, synchronized GUIs that are dynamically generated by the software exploration tool. In operation, an analyst user may interacting with the GUIs may identify clusters of similar documents (as well as outliers) displayed in a three-dimensional time series plot. Next, the analyst can use a mouse pointer or other input device to circle any number of data clusters. Once a cluster is selected, topics identified by the server in the text of the data clusters may be displayed with the most relevant terms (words) within each topic associated with the selected cluster. By observing the terms within each topic, the analyst may identify themes and context within the selected cluster of documents. To obtain a deeper understanding of the context in the documents, the server may generate a spreadsheet containing an extract of the documents in the selected cluster and display the spreadsheet to the analyst in a GUI. The analyst may filter by topic number, topic term, document author (e.g., member), date, or any other variable coded into the text exploration software on the client side. Consequently, the text exploration environment not only automates costly activities, but also allows a human analyst to efficiently identify hidden themes and context within a large corpus of documents to gain actionable insights.

FIG. 1 shows components of a system 100 according to an exemplary embodiment. The exemplary system 100 may comprise an analytics server 101, a corpus database 103, an analyst device 105, data sources 107, and customer devices 109. Customer devices 109 may contact various data sources 107, via the Internet 110 or telecommunications network 111, at which time text data is transmitted to the data sources 107 data or text data is generated by the data sources 107. The text data may be transmitted via one or more internal networks 106 and stored into a corpus database 103 that is accessible to the analytics server 101. The analyst device 105 may access a text exploration software tool that interacts with the analytics server 101 in a client-server relationship, such that the text exploration software provides instructions to the analytics server 101 to perform any number of instructions and then the output of those instructions are displayed on one or more GUIs at the analyst device 105.

An analytics server 101 receives data in various formats from a corpus database 103 to determine various themes and context from the unstructured text, and then provides real-time, dynamically updated data that may be displayed as a GUI at an analyst device 105. The analytics server 101 may be any computing device comprising computer-networking components and a processor capable of performing the various tasks and processes described herein. Non-limiting examples of the analytics server 101 may include a server, a desktop computer, a laptop computer, and a tablet, among other types of devices. The analytics server 101 may be coupled to any number of data sources 107 via one or more networks 106. In some cases, the analytics server 101 may comprise non-transitory machine-readable storage medium hosting a corpus database 103; and, in some cases, the analytics server may be coupled via a network connection to a computing device that hosts the corpus database 103.

The analytics server 101 may have a client-server relationship with an analyst device 105, such that the analyst device 105 may access the analytics server 101 to generate or access certain types of data that may be displayed to an analyst user through one or more GUIs by text exploration software executed by the analyst device 105. The tasks associated with generating the data underlying the GUIs may be executed by the analytics server 101 or may be shared between the analytics server 101 and the analyst device 105.

Data sources 107 may be internal or external systems that generate machine-readable text files that may be ingested by the analytics server 101 and stored into the corpus database 103. Non-limiting examples of data sources 107 may include an interactive voice-recognition (IVR) system that generates and stores transcriptions of telephone calls, an online chat service that stores logs of chat sessions between a service representative and a customer computer, an email server, and other text-based data storage systems, such as surveys and social media postings. The data sources 107 may generate and transmit the text as document files to the analytics server 101, where the document files may be stored into the corpus database 103.

Customer devices 109 may be any type of device, such as a telephone 109a or computer 109b-d, capable of communicating with a particular data source 107 through one or more channels (e.g., telephone, online chat). The data or audio interaction of the devices may be logged into a data source database 108, and in some cases transcribed into a transcription document containing the text of the interactive session, survey, or posting.

Figure 2:
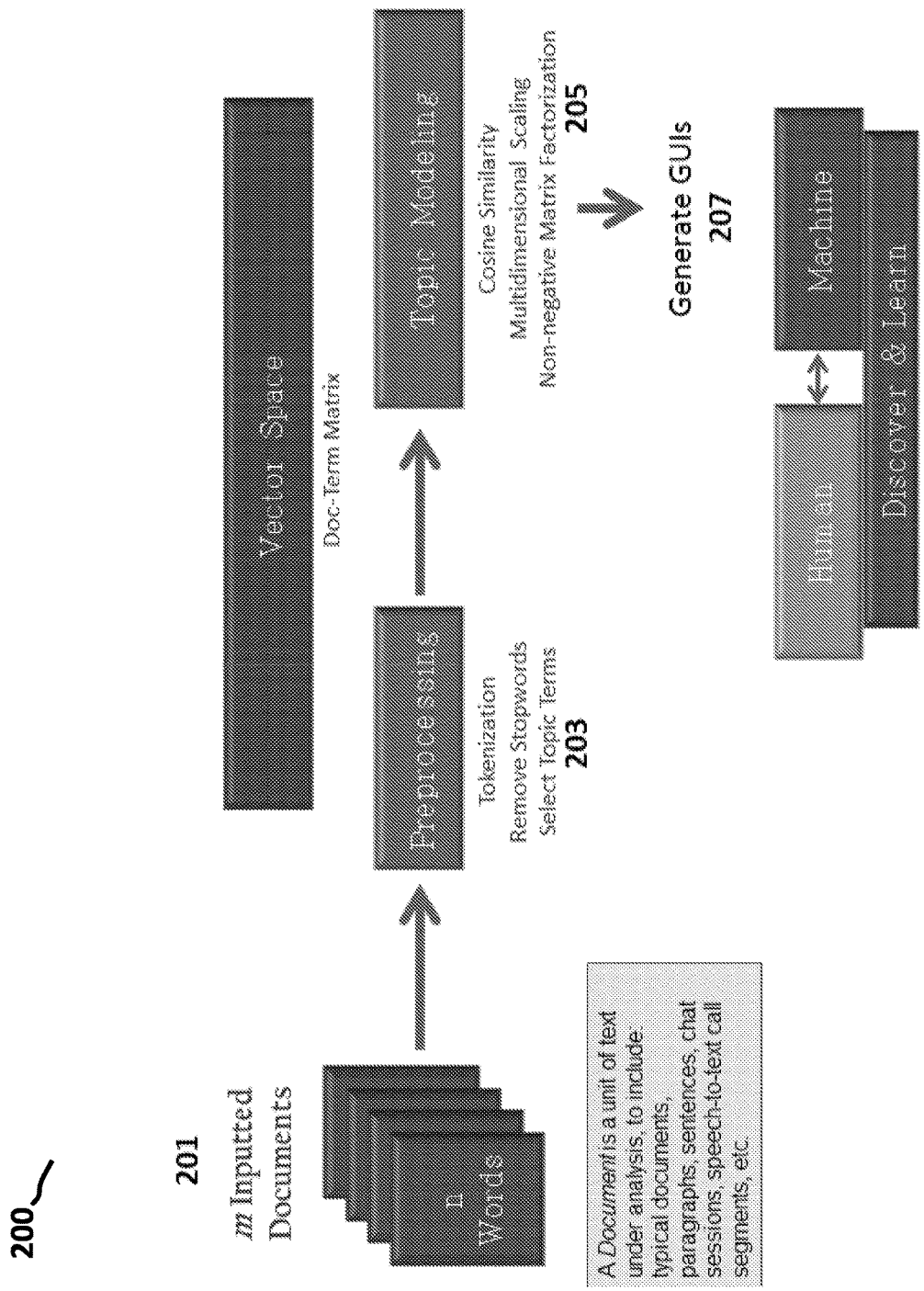
FIG. 2 shows execution of a method, according to an exemplary embodiment.

FIG. 2 shows execution of a method 200 according to an exemplary embodiment. The exemplary method 200 comprises multiple phases that are shown in FIG. 2 as steps 201, 203, 205, and 207. However, one having skill in the art would appreciate that other representations or embodiments may contain additional or alternative steps, or may omit one or more of the steps seen in FIG. 2 altogether.

In a first step 201, the server may receive any number of machine-readable files, sometimes called "documents" in the art, containing text inputs. Given a corpus of any number of documents, each of these documents may have any number of words and so N, once again, being any number. Documents may be considered any unit of text data; non-limiting examples of a document may include a whole word-processing document, a paragraph, a sentence, a group of one or more words, transcriptions of phone calls, online chat sessions, social media posts, and condensed textual feedback received from a survey, among others.

In a next step 203, the system will execute various preprocessing tasks on the inputted documents. In such embodiments that execute the current step 203, particularly where there is a large corpus of document files, the server may perform one or more preprocessing tasks on the text that will make later processing more efficient and accurate. The server may identify vocabulary of words throughout the whole corpus, which may extract to an output file to be used in the topic modeling of a later step 205.

In some implementations, the server may perform tokenization where the server may parse the text into one or more smaller segments, such as words or sentences, and put the parsed portions into single units or words.

In some implementations, the server may be configured to identify and remove so-called "stop words" in the corpus, according to a stop word file or stop word list stored in the server. Non-limiting examples of stop words may include articles (e.g., the, a, an), conjunctions (e.g., or, and), pronouns (e.g., I, he, she, you), and prepositions (e.g., to, at, on), among other common words that may not provide context for the document, and so would not be relevant for later topic modeling processes. In some embodiments, the server may execute a topic modeling process during the preprocessing phase of the current step 203. This may be done when the server attempts to identify a vocabulary of key topics that are contained within the entire corpus. In such embodiments, the server may then perform one or more topic modeling processes in a subsequent phase, such as a following step 205.

In some implementations, the server may generate and display via a graphical user interface (GUI) a frequency plot of all the words of the vocabulary that are identified in the corpus. This allows an analyst user to identify whether there are any undesired terms, such as stop words, that were tokenized and extracted into the output vocabulary file.

In a next step 205, after preprocessing, the system will execute various topic modeling tasks on the inputted documents.

The server may execute one or more processes employing techniques for modeling or identifying contextual topics in the text of the corpus. For instance, the server may perform topic modeling using matrix factorization that identifies topics within clusters of documents within the corpus. In an embodiment, the server may determine a topic for a text file based on one or more words satisfying a pre-determined threshold (e.g., the text file contains a topic word more than a pre-determined threshold number of times). In other embodiments, the server may select the topic with the highest frequency of occurrence as the primary topic within the corpus.

As another example, the server may identify sets of words or vocabularies parsed from the text to determine a "distance" measure that indicates the similarity between documents. Based on these distances, the server may perform multi-dimensional scaling. Each document is a multi-dimensional vector of words or vocabularies, such that all documents in the corpus form an M by N matrix, where M represents all the documents in the corpus, and N is a column along those document entries representing the words identified and extracted from each of the documents. The constructed matrix is a document-term matrix. In this example, N represents the vocabulary of the entire corpus of M documents. Because the system may generate any number of words for each vocabulary across any single document, the server may be working in a factor space of hundreds or thousands of dimensions. A human cannot envision nor operate beyond a three-dimensional space, so in a later step 207, the server may generate one or more GUIs that present the multi-dimensional results in a visual space comprehensible to a human, by using multi-dimensional scaling that algorithmically simplifies the multi-dimensional factor space in a way that the server may project the information about the corpus into a three-dimensional phase and a two-dimensional phase comprehensible to a human. As an example, the server may generate a vocabulary for 411 documents (e.g., transcriptions of voice calls), from which 61 distinct words were extracted, resulting in a 411-by-61 matrix. In other words, each one of the chat session entries is really 61 dimensions.

In a next step 207, generate one or more graphical user interfaces (GUIs) based upon the topic modeling. Here the server may generate a three-dimensional rendering of the documents and two-dimensional rendering of the documents, whereby the documents are placed in locations based on relative distances.

Continuing with multi-dimensional scaling, the server uses, for example, cosine similarity to determine a "distance" between the documents based on the words extracted from the respective documents. Then after determining the distance between each pair of documents in the multi-dimensional space, the server determines the position vectors for each document in a three-dimensional space while maintaining the same relative distances from the multi-dimensional space. So the nature of an X-to-Y axis values presented on the three-dimensional representation would be the values resulting from multi-dimensional scaling, based on the values of, for example, 61-dimensions in the actual conversation matrix.

Figure 5:
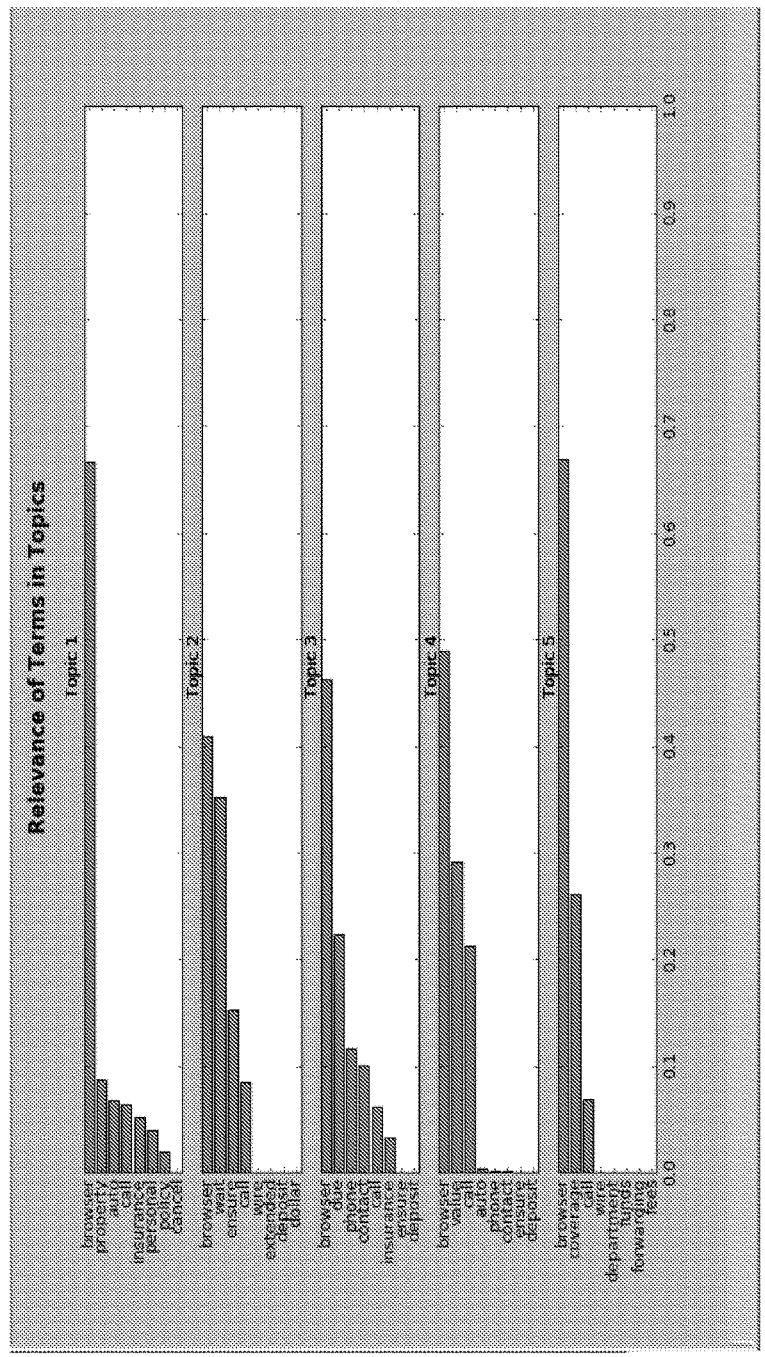
FIG. 5 shows a graphical user interface, according to an exemplary embodiment of FIG. 3 and FIG. 4.

In some embodiments, the server may use non-negative matrix factorization for text mining/exploration applications. Specifically, the server may construct the aforementioned document-term matrix with the weights of various terms/words (typically weighted word frequency information) from the set of documents. The server may factor/decompose the document-term matrix into a term-topic matrix and a topic-document matrix by using non-negative matrix factorization algorithm. The server may derive the topics from the contents of the documents. The term-topic matrix may include a limited number of topics and the most relevant terms within each topic. The term-topic matrix may show the weight of the strength of association between the terms and the topics. For example, for a topic, the most relevant terms may have the highest weight values. In other words, the server may be able to determine the most relevant terms/words for each topic based on the weight values in the term-topic matrix. FIG. 5 shows a graphical user interface of the relevance of terms in topics, where there are five topics with each topic having eight most relevant terms. The topic-document matrix may show the weight of the strength of association between the topics and the documents. The server may determine data clusters of related documents based on the topic-document matrix.

In addition, the server may determine a primary topic for each document. More specifically, a higher weight value in the topic-document matrix may indicate a stronger association between the corresponding topic and document. Although each document may be associated with multiple topics, there may be only one topic that has the highest weight value, which is the primary topic. For example, there may be five topics (topic 1, topic 2, topic 3, topic 4, and topic 5) discussed in the documents (e.g., transcriptions of voice calls). Each topic may be a primary topic for a certain number of documents. For example, there may be 300 documents with topic 1 as their primary topic. Another 500 documents may have topic 4 as their primary topic. By automatically identifying the primary topics and the volume of the primary topics being discussed, the server may allow the analyst user to identify potential problems and gain insights on other related issues. As a result, the analyst user may be able to seek solutions to better serve the customers and/or improve the user experiences. Instead of reading the large amount of documents/transcripts manually to determine the topic modeling results, the analyst user may have a graphical interactive interface displaying the terms, topics, clusters, distances and/or similarities and other related information displayed on the analyst device. Considering the large amount of documents, the systems and methods discussed herein may provide a more accurate and efficient solution for text exploration.

In one or more embodiments, the server may determine the trend of the primary topics being discussed over a period of time. For example, the server may determine the number of documents (e.g., transcriptions of voice calls) with topic 1 as the primary topic in one month is 500. The server may keep tracking the number/volume of documents with topic 1 as their primary topic. Assuming the number of documents with topic 1 as their primary topic increases to 800 in the next month, the server may determine the trend of primary topic 1 being discussed is increasing. The server may provide alert/reminder to draw attentions for the problem. Based on the historical data of the trend of primary topics over the time period, the server may generate a histogram presenting a distribution of the volume of the primary topics across the corpus. The trend of primary topics may not only identify the potential problems and draw attentions on such problems, but also provide helpful insights on performance of the solutions. For example, after receiving alerts on the problems associated with an increasing trend of a specific primary topic, the system administrator may implement actions to solve the problems. If the solutions are effective, there should be a decreasing trend of the primary topic in the following months. Thus, the analyst user may be able to evaluate the effectiveness of the solutions based on the trend of the primary topic after the implementation of the solutions.

Figure 3:
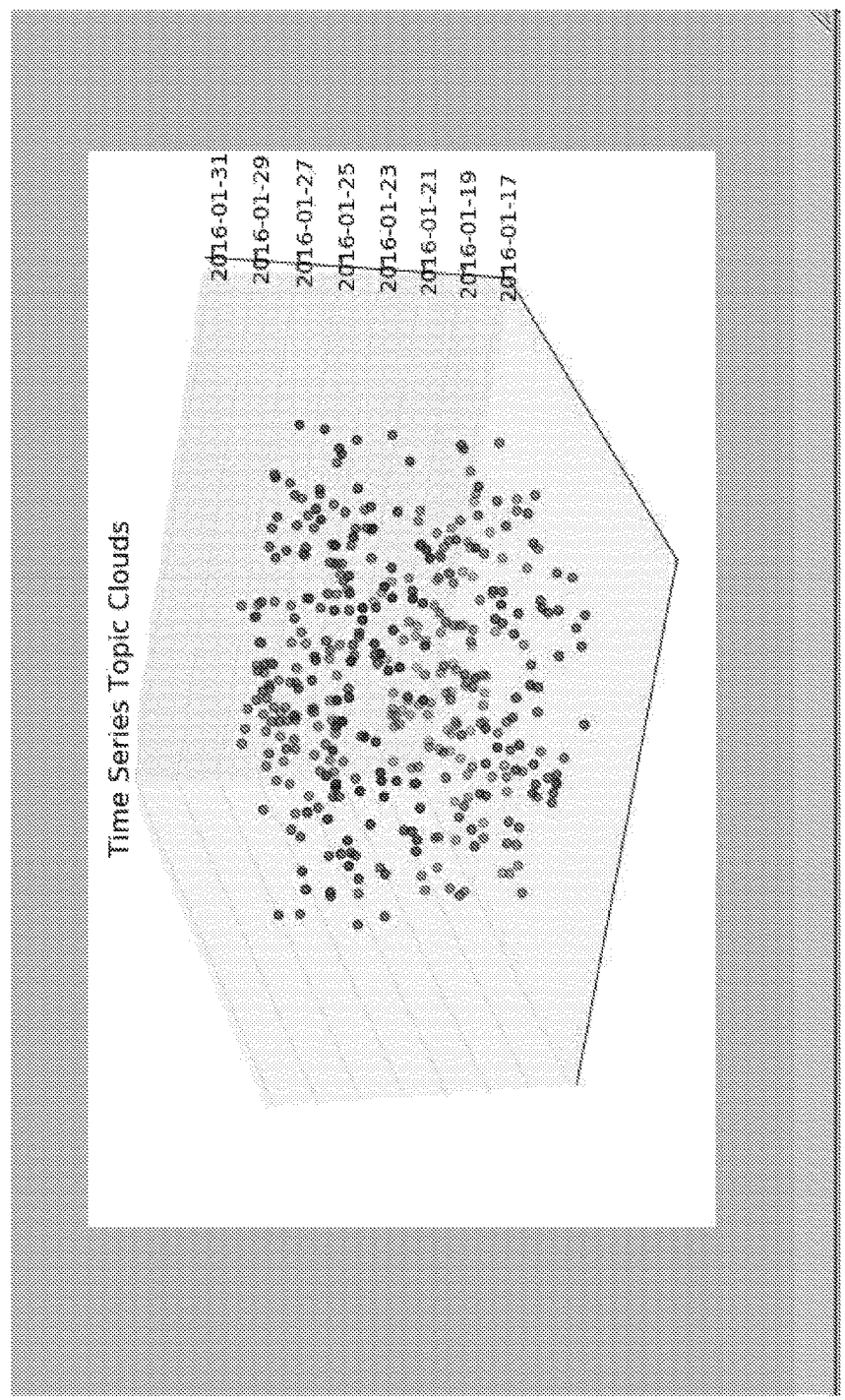
FIG. 3 shows a graphical user interface, according to an exemplary embodiment.

FIG. 3 shows a graphical user interface 300 according to an exemplary embodiment. For ease of explanation, the corpus in this example may comprise the text transcriptions from about eleven telephone conversations generated by a voice-call data source of a service center, comprising an interactive voice-recognition (IVR) server and an associated database that stores the text files containing the transcriptions. In this example, the server retrieves the eleven chat sessions (where the chat sessions are represented as dots in the GUI 300); each one of the chat sessions has a 94-dimensional factor that is being projected into a three-dimensional space, where the total matrix generated for the chat sessions have about 94 terms extracted from the corpus. That is, each dot represents a conversation between a customercaller and an MSR. The placement of each conversation dot may be placed based on the time of the conversation and based on the relative word or vocabulary distances determined for each of the conversation dots. In operation, an analyst user, such as an MSR, may select or circle several dots of interest when the user identifies patterns of dense clusters of conversation dots having low relative distances between each other, suggesting that the words and topics are relatively similar. The underlying executable code is instructing the server to determine the vectors for the 94-dimensions of the words to determine the placement of the conversation dots in the GUI 300.

Figure 4:
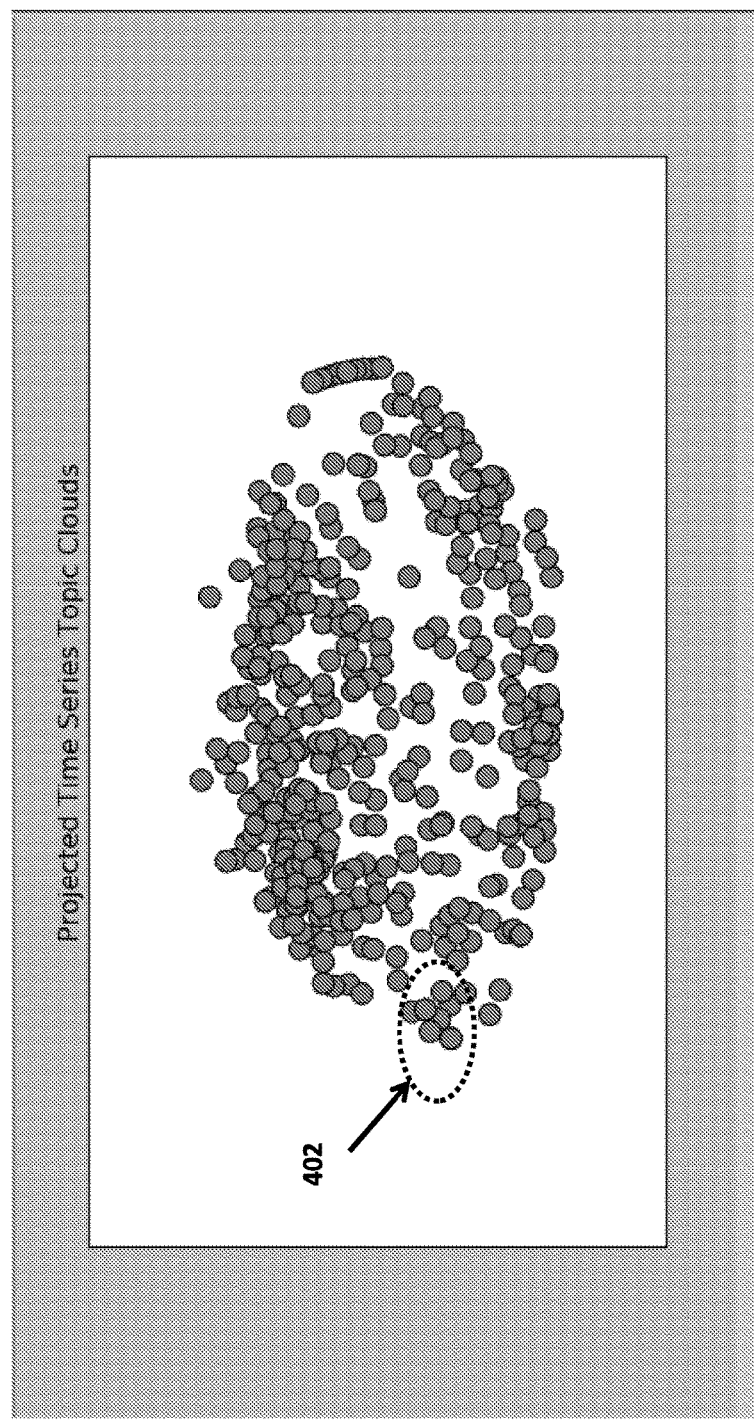
FIG. 4 shows a graphical user interface, according to an exemplary embodiment of FIG. 3.

FIG. 4 shows a graphical user interface 400 according to the exemplary embodiment of FIG. 3, which may be generated when a user selects certain conversation dots from a top-level GUI 300.

After selecting the subset of conversation dots, the software instructs the server to project the three-dimensional space into a GUI 400 displaying two-dimensions. The user may select a set of conversation dots to receive more thorough data about the selected conversations that are densely clustered due to their common context (e.g., words, topics). For example, the user may select a dense cluster of conversation dots by putting a circle 402 around the cluster. In some embodiments, the user may select dense clusters. In some other embodiments, the user may select outlying clusters. Based on the selection of the conversation dots of the two-dimensional GUI 400, the underlying software code instructs the server to automatically produce a set of "topics," which may be displayed in a topics GUI 500. In addition, the server may automatically display the primary topics associated with the selected conversation dots.

FIG. 5 shows a graphical user interface 500 according to the exemplary embodiment of FIG. 3 and FIG. 4. This topics GUI 500 may be generated by the server after the server identifies a set of topics found in the cluster of selected conversation dots. The topics GUI 500 displays the topics, in this example there are five topics shown, found in the underlying conversation text. Under each topic, the topics GUI 500 may display a set of relevant terms, in this case eight terms, within that topic. So as soon as the user circles that cluster of conversations in a prior GUI 300, 400, the server may produce a list of topics with relevant terms, but the server may also, in some embodiments, produce an extract of the actual conversation, shown in a spreadsheet GUI 600.

FIG. 6 shows a graphical user interface 600 according to the exemplary embodiment of FIG. 3, FIG. 4, and FIG. 5. As mentioned previously, when the user circles a cluster of conversations in a prior GUI 300, 400, the server may generate a spreadsheet 600 containing an extract of the actual conversation text. The server may produce a spreadsheet file that can be filtered by date, telephone number, topic number, topic term, document author (e.g., customer), browser, or other information captured from the conversation and stored with the text of the conversation.

Figure 7:
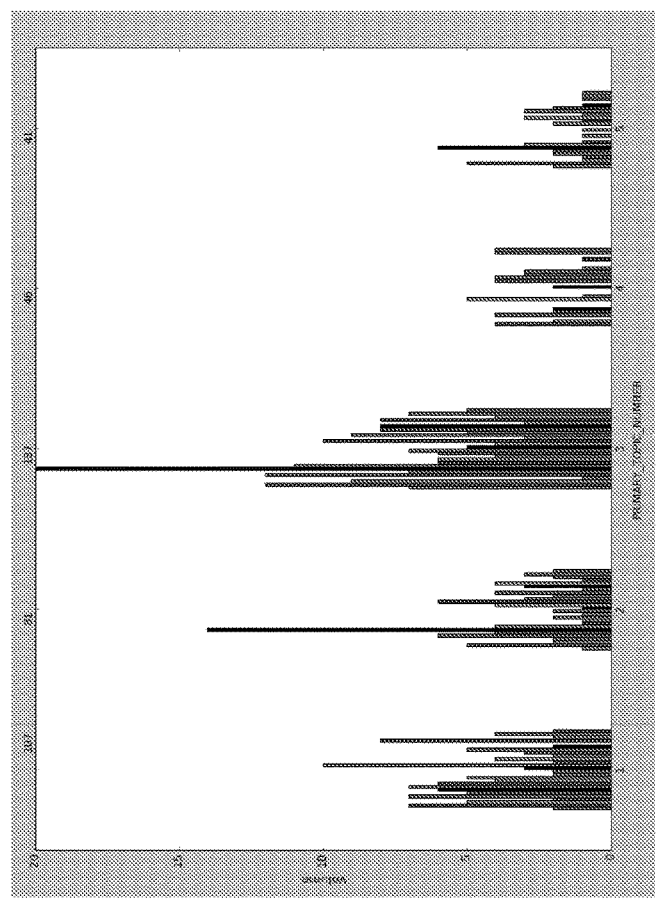
FIG. 7 shows a graphical user interface, according to the exemplary embodiment of FIG. 4 and FIG. 5.

FIG. 7 shows a graphical user interface 700 according to the exemplary embodiment of FIG. 4 and FIG. 5. As mentioned previously, when the user circles a cluster of conversations in a prior GUI 300, 400, the server may generate a histogram identifying the primary topics being discussed in the selected cluster. For example, the server may identify and count the primary topic discussed in each document in the corpus, and present a distribution showing the volume of the primary topics across the corpus. FIG. 7 presents a distribution of primary topics across a corpus consisting of 462 documents. As shown in the figure, Topics 3 has the largest volume by being a primary topic of discussion in 187 out of the 462 documents. Furthermore, within each topic category, the server may also provide a histogram over the time period in which the documents were created. For example, the server may keep tracking the volume of each primary topic across the corpus every month for the period of a whole year, and display the trend of the primary topic during the whole year as a histogram. In one or more embodiments, the tracking frequency (e.g., once a week, once a month) and the length of time period (e.g., for a year) may be rendered by the user through an interactive user interface. Consequently, this capability may not only identify the most significant topic(s), but also allow the analyst user to identify emerging trends over time within each topic category.

By allowing the user to interact with the graphical user interfaces discussed above, the server may provide human machine teaming capabilities in text exploration. Specifically, the server may perform unsupervised machine learning on the large amount of raw data of corpus without requiring prior knowledge on the contents of the corpus and automatically compute the terms, topics, clusters, distances and/or similarities and other related information. Instead of letting teams of human analysts read thousands of call transcripts, online chat transcripts, and other unstructured text files, which is costly and error prone, the machine learning process may provide a more accurate and efficient solution for text exploration. The server may also display the machine learning results on the graphical user interfaces. Based on the GUI, the user may select clusters, learn the topics and terms in the selected clusters, and identify potential problems. Thus, the human machine teaming capabilities may leverage the machine's strengths to reveal structures and interrelations, and human's strengths to identify patterns and critique solutions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method, comprising:
    generating a vector for each text file of a plurality of text files to define a plurality of vectors, wherein a value of a dimension of each vector of the plurality of vectors corresponds to a frequency of occurrence of a word or words in each respective text file of the plurality of text files;
    generating a matrix corresponding to the plurality of vectors;
    decomposing the matrix to generate:
        a term-topic matrix indicative of strengths of association between the word or words in respective text files of the plurality of text files and topics for the respective text files, and
        a topic-document matrix indicative of strengths of association between the topics and the respective text files of the plurality of text files, wherein the topic-document matrix comprises weight values indicative of the strengths of association between the topics and the respective text files;
    determining a respective primary topic for each text file of the plurality of text files based on the respective primary topic corresponding to a topic associated with a highest weight value for the text file as indicated by the topic-document matrix; and
    generating a graphical user interface (GUI) that displays the respective primary topic for each text file of the plurality of text files.

2. The computer-implemented method of claim 1, comprising:
    determining a trend of the respective primary topic for each text file of the plurality of text files over a period of time; and
    generating an additional GUI that displays the trend of the respective primary topic for each text file of the plurality of text files.

3. The computer-implemented method of claim 2, wherein generating the additional GUI comprises generating a histogram to display the trend of the respective primary topic for each text file of the plurality of text files.

4. The computer-implemented method of claim 2, wherein generating the additional GUI comprises displaying a quantity of text files of the plurality of text files associated with each respective primary topic over the period of time.

5. The computer-implemented method of claim 1, comprising generating an additional GUI that displays the topics for one of the plurality of text files based on the term-topic matrix.

6. The computer-implemented method of claim 1, comprising:
    determining a quantity of topics shared between the plurality of text files based on the term-topic matrix and the topic-document matrix; and
    generating an additional GUI comprising a plurality of images representing the plurality of text files, the plurality of images being positioned relative to one another based on the quantity of topics shared between the plurality of text files.

7. The computer-implemented method of claim 6, comprising:
    determining respective distances between the plurality of images based on the quantity of topics shared between the plurality of text files; and
    positioning the plurality of images relative to one another in accordance with the respective distances between the plurality of images via the additional GUI, wherein the respective distances are inversely related to the quantity of topics shared between the plurality of text files.

8. A tangible, non-transitory computer-readable medium comprising instructions that, when executed by processing circuitry, are configured to cause the processing circuitry to perform operations comprising:
    defining a plurality of vectors by generating a vector for each text file of a plurality of text files, wherein a value of a dimension of each vector of the plurality of vectors corresponds to a frequency of occurrence associated with a word or words in each respective text file of the plurality of text files;
    generating a matrix corresponding to the plurality of vectors;

determining topics associated with each text file of the plurality of text files by decomposing the matrix using a non-negative matrix factorization algorithm to generate a term-topic matrix indicative of strengths of association between the word or words in the respective text files of the plurality of text files and associated topics and to generate a topic-document matrix indicative of strengths of association between the associated topics and the respective text files;

determining a respective primary topic for each text file of the plurality of text files based on the respective primary topic having a highest strength of association of the strengths of association between the associated topics and the respective text files to obtain a plurality of primary topics; and generating a graphical user interface (GUI) that displays the plurality of primary topics.

9. The tangible, non-transitory computer-readable medium of claim 8, wherein the operations comprise displaying the plurality of primary topics and the text file of the plurality of text files associated with each primary topic of the plurality of primary topics.

10. The tangible, non-transitory computer-readable medium of claim 8, wherein the operations comprise:
determining a first quantity of text files of the plurality of text files associated with a primary topic of the plurality of primary topics at a first interval of time; and
determining a second quantity of text files of the plurality of text files associated with the primary topic at a second interval of time.

11. The tangible, non-transitory computer-readable medium of claim 10, wherein the operations comprise generating an additional GUI that displays the first quantity of text files associated with the primary topic at the first interval of time and that displays the second quantity of text files associated with the primary topic at the second interval of time.

12. The tangible, non-transitory computer-readable medium of claim 8, wherein the operations comprise generating an additional GUI comprising a plurality of images representing the plurality of text files, the plurality of images being positioned relative to one another based on respective relative distances between the plurality of text files, the respective relative distances being indicative of a quantity of topics shared between the plurality of text files as determined via decomposing the matrix using the non-negative matrix factorization algorithm, and smaller relative distances being indicative of greater quantities of topics shared.

13. The tangible, non-transitory computer-readable medium of claim 8, wherein the topic-document matrix comprises weight values indicative of the strengths of association between the associated topics and the respective text files, and wherein the operations comprise determining the respective primary topic for each text file of the plurality of text files based on the respective primary topic corresponding to a topic associated with a highest weight value.

14. The tangible, non-transitory computer-readable medium of claim 8, wherein the operations comprise generating an additional GUI that displays a transcription of each text file of the plurality of text files.

15. The tangible, non-transitory computer-readable medium of claim 8, wherein the operations comprise generating an additional GUI that displays a strength of association between the associated topics and a text file of the plurality of text files.

16. A computer system, comprising:
processing circuitry; and
a memory comprising instructions that, when executed by the processing circuitry, are configured to cause the processing circuitry to perform operations comprising:
generating a vector for each text file of a plurality of text files to define a plurality of vectors, wherein a value of a dimension of each vector of the plurality of vectors corresponds to a frequency of occurrence of a word or words in each respective text file of the plurality of text files;
generating a matrix corresponding to the plurality of vectors;
generating a term-topic matrix indicative of strengths of association between the word or words in the respective text files of the plurality of text files and topics for the respective text files by decomposing the matrix using a non-negative matrix factorization algorithm;
generating a topic-document matrix comprising weight values indicative of strengths of association between the topics and the respective text files of the plurality of text files by decomposing the matrix using the non-negative matrix factorization algorithm;
identifying a topic of a text file of the plurality of text files associated with a highest weight value to select the topic as a primary topic of the text file; and
generating a graphical user interface (GUI) for display on a device, wherein the GUI displays the primary topic for the text file.

17. The computing system of claim 16, wherein the operations comprise selecting the topic as the primary topic of a subset of text files of the plurality of text files based on the topic being associated with the highest weight value for each text file of the subset of text files, and the subset of text files comprises the text file.

18. The computing system of claim 17, wherein the operations comprise generating an additional GUI that displays a quantity of the subset of text files associated with the topic selected as the primary topic of the subset of text files.

19. The computing system of claim 16, wherein the operations comprise:
determining respective distances spanning between the plurality of text files based on a quantity of topics shared between the plurality of text files as indicated by the term-topic matrix and the topic-document matrix, wherein the respective distances are inversely related to the quantity of topics shared between the plurality of text files; and
generating an additional GUI for the display on the device, wherein the additional GUI comprises a plurality of images representing the plurality of text files, the plurality of images being positioned relative to one another based on the respective distances, and the respective distances are inversely related to the quantity of topics shared between the plurality of text files.

20. The computing system of claim 19, wherein the operations comprise:
receiving, via the additional GUI, a user input comprising a selection of an image of the plurality of images representing the text file of the plurality of text files; and
generating the GUI that displays the primary topic for the text file in response to receiving the user input.

* * * * *